Figure 1:
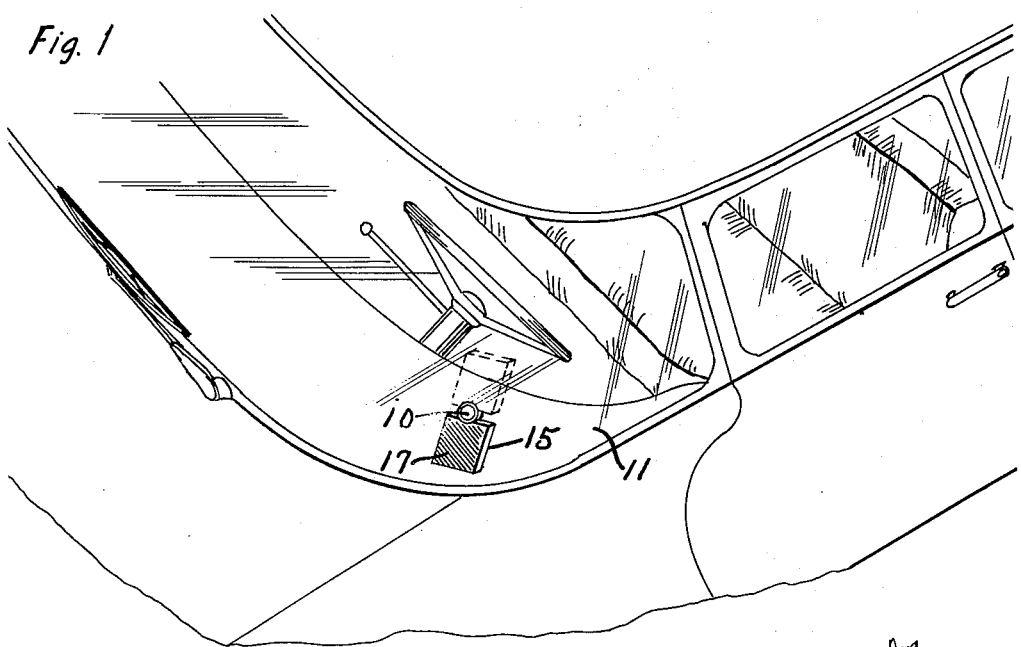

Nov. 7, 1961  D. G. PETERSON  3,007,435
HIGHWAY TRAFFIC SAFETY SIGNAL
Filed Aug. 31, 1959

David G. Peterson
INVENTOR.

BY A. T. Sperry
ATTORNEY

United States Patent Office 3,007,435
Patented Nov. 7, 1961

3,007,435
HIGHWAY TRAFFIC SAFETY SIGNAL
David G. Peterson, 4003 South West Shore Blvd.,
Tampa, Fla.
Filed Aug. 31, 1959, Ser. No. 837,188
2 Claims. (Cl. 116—28)

This invention relates to the transmission of traffic and highway condition information from one moving vehicle to another while the vehicles are passing in opposite directions.

The present invention therefore provides a method by which vehicles having traversed areas of potentially dangerous traffic conditions, may warn oncoming vehicles of such conditions long prior to the possibility of observation of such areas by the operators of the oncoming vehicles. Further, the present method provides for the transmission of information as to generally safe and normal traffic and highway conditions at distances far exceeding that observable by the vehicle operator.

In that form of signal structure, presently proposed by way of illustration for carrying out the inventive concept of the present method and constituting one structural embodiment of the present invention, there is provided means under the control of a vehicle operator for visually displaying a readily controlled signal to oncoming traffic. Such signal may selectively indicate that the road conditions through which he has passed are either normally safe, or present unexpected hazards for the approaching vehicle. The present structure provides a novel, simple, efficient and effective device, admirably adapted to meet the demands of economic manufacture. Broadly speaking, the device may be generally defined as a pair of contrastingly colored surfaces, preferably reflective, as for instance, a green surface to denote safe driving conditions, and contrastingly colored surface, such as red, to indicate hazardous conditions through which a vehicle has passed. More specifically, the present structure may be defined as including a supporting member for attachment to the inner surface of a windshield and a pivotally attached signal plate with contrasting color on its opposite face. This arrangement is such that by pivotal movement the danger indicating surface may be displayed through the windshield to oncoming traffic, or by manual selective movement the operator may display the opposite safe indicating side of the device.

Figure 2:
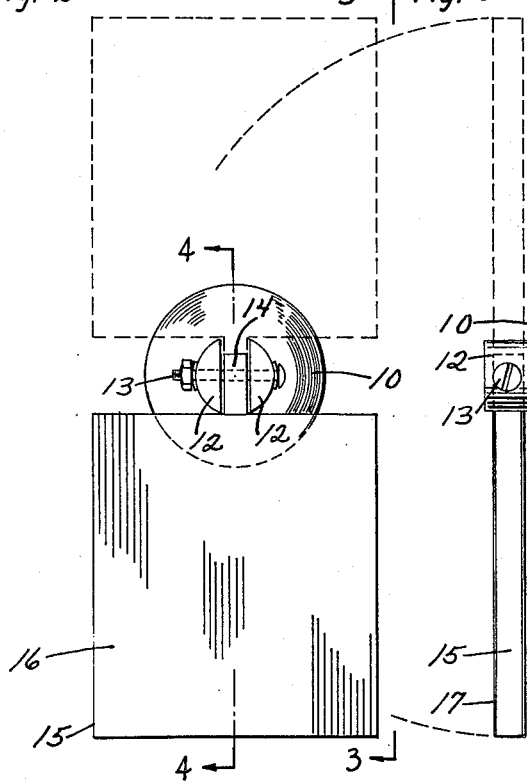
Figure 3:
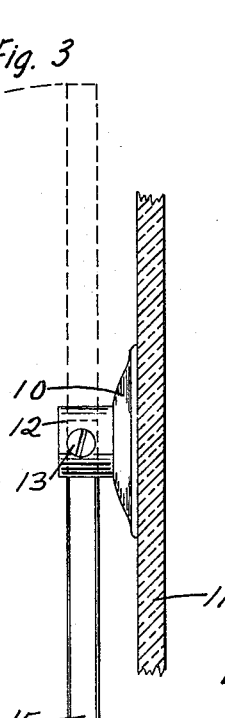
Figure 4:
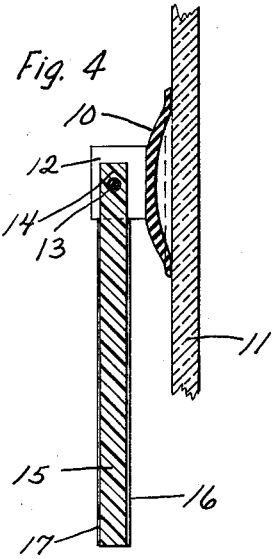

From the foregoing, it will be seen that it is among the primary objects of the invention to provide a device for transmitting traffic and roadway condition information between oppositely moving vehicles. It is a further object of the invention to provide a novel, simple, effective and efficient means for inter-vehicular signalling by which such information may be exchanged. Numerous other objects, features and advantages of the present invention will be apparent from a consideration of the following specifications, taken in conjunction with the accompanying drawings in which:

FIG. 1 is a fragmentary perspective view of a vehicle mounting a signal instrument of the present invention, FIG. 2 is a relatively enlarged elevational view of the signal device per se, apart from the windshield, showing an alternate signal position by dotted lines, FIG. 3 is a side elevation of the device taken on the line 3—3 of FIG. 2 but showing the device mounted on the windshield, which is shown in section; and FIG. 4 is a sectional detail, taken on the line 4—4 of FIG. 2 showing the mounting means attached to the windshield.

As illustrated in the drawings, one preferred form of the present invention is shown by way of illustration, includes a simple, flexible, suction cup 10 which may be formed of rubber, synthetic rubber, plastic or other suitable material. The cup 10 is adapted to be affixed by suction to the inner face of the windshield 11 of the vehicle indicated in FIG. 1. The suction cup 10, or its equivalent, is preferably provided with a pair of parallel rearwardly protruding bosses 12 here shown as formed integrally with the body of suction cup. The bosses are spaced to constitute pivot arms between which extends a pintle 13, here shown in the form of a bolt. On the pintle 13 between the bosses 12, there is mounted the pivoted projection 14 of a signal plate 15 here shown as generally rectangular in configuration. In this form of the invention, it will be noted that since the bosses 12 are formed integrally with the rubber cup 10, their inner faces may frictionally engage the sides of the projection 14 under adjustable tension by the pintle bolt 13 to retain the plate 15 in selectively adjusted position.

The signal plate 15 may of course have any desired outline configuration. Economy of manufacture has indicated the formation of the plate of light-weight inexpensive transparent plastic. The face 16 of the disc is colored in a color contrasting with the color of the opposed face 17. In the preferred form of the invention the face 16 may be red, indicating danger, while the opposed face 17 may be green, indicating normal and safe driving conditions. In the preferred form of the invention, the coloring is applied by means of a reflective pigment, so that the color will be reflected a substantial distance in advance of the vehicle displaying the signal.

From the foregoing, it is believed that the method of exchanging information, between moving vehicles, of the present invention will be fully apparent. When driving conditions through which a vehicle has passed are normal the green side 17 of the plate 15 will be facing the windshield 11. This is here indicated in the full line positions of FIGURES 1, 2 and 3 with the plate pivoted downwardly from the suction cup 10 and with the surface substantially parallel with the windshield. An approaching driver noting the green signal will be assured that no unexpected hazards confront him. Conversely, when heavy traffic, road repairs, detours, accidents or other driving problems are traversed, the operator will turn the plate up, as in the dotted line position of FIGURES 1, 2, and 3, to display the red side 16. An approaching driver noting the red signal will be alerted to unforeseen problems and will control his vehicle accordingly. With both vehicles equipped with the present device an exchange of information is achieved. Further, should a preponderant number of vehicles mount such signals, all drivers will be continuously aware of road conditions far beyond their own field of vision.

While the structure here presented, constitutes one preferred embodiment of the invention, it will be understood that other forms of apparatus are comprehended and thus in the practice of the invention numerous changes, modifications, and the full use of equivalents may be resorted to without departure from the spirit or scope of the invention as outlined in the appended claims.

What I claim is:

1. A signal device adapted to be mounted on the windshield of an automobile for manipulation by the operator thereof to signal to the operator of an oncoming vehicle alternatively the safe or dangerous character of roadway conditions immediately to the rear of the signaling automobile, said device comprising a suction cup adapted to be adhered to the windshield, an opaque plate having at least one face provided with a reflective surface in a safety-indicating color and its opposite face provided with a reflective surface in a danger-indicating color, said opaque plate being pivotally mounted on said suction cup for manipulation through approximately 180° about said pivot to display alternatively through said windshield said two reflective surfaces.

2. A signal device as claimed in claim 1 in which the suction cup is of rubber-like material and is provided with a pair of integral spaced bosses having aligned openings and the pivotal mounting comprises a bracket outstanding from the plate having a perforated outer terminal portion disposed between said bosses, a bolt extending through said openings and perforation, and a nut threaded on the bolt for adjustably frictionally clamping the bracket between the bosses.

References Cited in the file of this patent

UNITED STATES PATENTS

| | | |
|---|---|---|
| 355,021 | Long | Dec. 28, 1886 |
| 1,422,179 | Coward | July 11, 1922 |
| 1,507,617 | McWilliam | Sept. 9, 1924 |
| 1,532,308 | Downing | Apr. 7, 1925 |

FOREIGN PATENTS

| | | |
|---|---|---|
| 17,603 | Great Britain | 1907 |